United States Patent [19]
van der Meulen

[11] Patent Number: 5,456,173
[45] Date of Patent: Oct. 10, 1995

[54] DEVICE FOR FIXING END RINGS IN A ROTARY SCREEN PRINTING STENCIL

[75] Inventor: Anthonius M. van der Meulen, Helmond, Netherlands

[73] Assignee: Stork Screens B.V., Raamstraat, Netherlands

[21] Appl. No.: 741,394

[22] PCT Filed: Jan. 24, 1990

[86] PCT No.: PCT/NL90/00010

§ 371 Date: Jul. 27, 1991

§ 102(e) Date: Jul. 26, 1991

[87] PCT Pub. No.: WO90/08652

PCT Pub. Date: Aug. 9, 1990

[30] Foreign Application Priority Data

Jan. 27, 1989 [NL] Netherlands .......................... 8900196

[51] Int. Cl.⁶ .................................................. B05C 17/04
[52] U.S. Cl. ................... 101/127.1; 101/128; 101/128.1
[58] Field of Search ............... 101/127, 127.1, 101/128, 128.1, 128.21, 128.4; 219/388; 392/416

[56] References Cited

U.S. PATENT DOCUMENTS

| | | | |
|---|---|---|---|
| 4,044,669 | 8/1977 | Luther | 101/127.1 |
| 4,177,728 | 12/1979 | Koreska | 101/128.21 |
| 4,186,660 | 2/1980 | Key. | |
| 4,406,944 | 9/1983 | Crain et al. | 219/388 |
| 4,556,783 | 12/1985 | Naruse et al. | 219/388 |
| 4,820,365 | 4/1989 | Brumm et al. | 392/416 |
| 5,066,850 | 11/1991 | Kondo | 219/388 |
| 5,142,795 | 9/1992 | Abbott | 219/388 |
| 5,196,676 | 3/1993 | Hallahan | 219/388 |

FOREIGN PATENT DOCUMENTS

| | | |
|---|---|---|
| 2234136 | 6/1974 | France. |
| 2320828 | 8/1975 | France. |
| 2492949 | 4/1982 | France. |

Primary Examiner—Edgar S. Burr
Assistant Examiner—John S. Hilten
Attorney, Agent, or Firm—Weintraub, DuRoss & Brady

[57] ABSTRACT

A device for fixing end rings in the ends of a rotary screen printing stencil wherein a layer of adhesive, which has been applied between the end rings and the ends of said stencil, is hardened by using infra-red radiation producing means such as infra-red radiators. Such radiators each have a reflector which is insulated at their back-sides. During the treatment with infra-red radiation, the assembly of end rings and printing stencil may be rotated around the longitudinal axis of the stencil.

6 Claims, 1 Drawing Sheet

DEVICE FOR FIXING END RINGS IN A ROTARY SCREEN PRINTING STENCIL

FIELD OF THE INVENTION

The invention relates to a device for fixing end rings in the ends of a rotary screen printing stencil, in which means are present for positioning the stencil and the end rings relative to each other, thus forming an assembly thereof, and heating means to make adhesive, which can be applied to the adhesive edge of each of the end rings for the formation of a connection between a stencil and an end ring, form said connection through adhesion.

BACKGROUND OF THE INVENTION

Such a device is known and is used for fixing end rings in a rotary screen printing stencil. A rotary screen printing stencil is generally a seamless, metal perforated cylinder, for example of electrodeposited nickel which is covered pattern-wise with a lacquer, and in which the parts not covered correspond to the pattern which is required to be printed on a substrate, for example textiles. In order to print such a pattern, the rotary screen printing stencil is brought rotating into contact with a substrate to be provided with a pattern, while the peripheral speed of the stencil and the speed of movement of the substrate are essentially the same. Inside the stencil a printing paste is fed in and is pressed by means of a fixed squeegee through the perforations of the stencil and thus arrives on the substrate. For the fixing of a rotary screen printing stencil in a printing machine, the stencil has fixed in it so-called end rings which at one side have an adhesive edge which is connected by gluing to the inside of the stencil and at the other side have a clamping edge or bayonet edge which is connected to stencil fixing heads which are located on the machine and grip the stencil at the two ends, and which exert tensile force in the lengthwise direction of the stencil. The stencil sheads fixed on the printing machine are driven by means of the machine drive, and in these ways the stencil can be given a speed of rotation in which the peripheral speed is essentially the same as the speed of movement of the substrate. The commonly used end rings are made of aluminium injection mouldings and are used on a wide scale.

During operation of the known device described above the end rings used and the inside edge of the stencil are provided with a coating of adhesive and subsequently positioned relative to the stencil and pushed from that position to a position in which the adhesive edge present on the end rings falls within the periphery on the two ends of the stencil in question. A heating element is then placed inside the end rings in contact with the material of said end rings. The heat produced by the heating elements is conveyed by convection to the border area between the adhesive edge and the stencil where there is a quantity of adhesive which under the influence of heat can produce a connection between the stencil and an end ring by gelling and/or polymerization of the adhesive. Such an adhesive is often a thermosetting adhesive such as a thermosetting epoxy resin system. Such a heating possibility was considered necessary in the known devices on account of the relatively great heat sensitivity of, for example, the nickel material of such rotary screen printing stencils. Heating of such a material above, for example, 250° C. for certain types of stencil produced the risk of an embrittlement of the nickel material, which had a very adverse effect on the service life of the stencil material in question. By introducing the heat in a controlled manner via the end ring which had a relatively great mass, it was possible to make sure that a temperature below 250° was maintained.

Such heating of an adhesive by introducing heat through convection via the end ring cannot, however, be carried out with the use of, for example, plastic end rings. In such cases use was generally made of so-called cold-setting adhesives such as, for example, cold-setting epoxy resin/hardener systems. However, such cold-setting adhesive systems have the disadvantage that they are not resistant to certain solvent systems or chemicals found in printing media, so that in those cases a thermosetting adhesive system is a necessity, but this is impossible in the case of plastic end rings.

OBJECT OF THE INVENTION

The object of the present invention is to provide a solution to the above-mentioned problem, and the invention is characterized in that the heating means are formed by infrared radiation-producing means which are set up at a distance at the outside of the rotary screen printing stencil in the vicinity of the ends thereof.

It was in fact, surprisingly, found that the use of infrared radiation-producing means ensures very good control of the temperature, which can produce adequate setting of a suitable adhesive, but with which it can be ensured in all cases that the temperature of, for example, the nickel stencil material does not exceed a critical temperature of, for example, 250° C.

It is assumed that an excessive temperature increase in the nickel material is prevented by the reflecting nature of said material, while a large part of the energy supplied by means of infrared radiation is supplied by reflection to the adhesive present between the adhesive edge of the end ring and the stencil. Excess adhesive is often present, so that some of it also penetrates through the perforations of the screen printing stencil and is present in the form of bulges on the outside of the stencil. This excess can be removed, if desired, before setting. The device according to the invention can be used successfully for metal end rings and where plastic end rings are used. In all cases, excellent adhesion of the adhesive edge in the end region of the stencil is achieved.

In particular, the infrared radiation-producing means are made up of several infrared radiators, while each of the infrared radiators used is provided with a suitable reflector which can beam the radiation to form a define beam, while a number of infrared radiators are selected in such a way that the partially overlapping beams can uniformly radiate the entire periphery of the stencil in question.

SUMMARY OF THE INVENTION

Where in general the infrared radiation-producing means can be formed by, for example, an annular infrared radiator extending around the periphery of the stencil in the vicinity of the end thereof, according to the special embodiment outlined above, such a large infrared radiation-producing device is divided into several smaller infrared radiators, each of which is expediently provided with a reflector. Through appropriate dimensioning of the reflector, it can be ensured that with a slight overlap of the various beams the total periphery of the stencil in question is irradiated uniformly at the ends (i.e. at the adhesive edge).

A heat-insulating material is advantageously provided in the vicinity of the rear side of each reflector, thereby preventing heat loss to the environment. It is very advantageous for the infrared radiation-producing means in the device according to the invention to be set up so that they are adjustable. Through, for example, varying the distance of the infrared radiators from the surface, it is possible to achieve a variation in the degree of overlap, so that the homogeneity of the heat effect is influenced.

In a very advantageous embodiment of the device, means are present in the device to make the assembly of a stencil to be provided with end rings and the end rings fitted in their place in the ends of the stencil carry out a rotation about the longitudinal axis of the stencil. Such a rotation is advantageous if one wishes to use a smaller number of infrared radiators, than would theoretically be necessary with minimal overlap to irradiate the entire periphery of the stencil end. By making the stencil and end ring assembly rotate, an averaging effect of the heat supply is achieved, with which a very good result can still be obtained.

If an element which extends around the entire periphery of the stencil at the adhesive edge is used, any lack of homogeneity due to an electrical connection point in such an element can be distributed overt he entire periphery, so that a homogeneous heating effect is still obtained.

It is very advantageous for the device according to the invention to contain means for measuring the temperature of the stencil in question at the adhesive receiving edge, while said means for measuring connected with a control circuit which ensures regulation of the working of the infrared radiation-producing means according to the difference between the measured value of the temperature and a set value.

In particular, if the temperature of the surface of the stencil is measured at the adhesive edge, it is possible to ensure better that a particular critical temperature of the stencil material used is not exceeded.

BRIEF DESCRIPTION OF THE DRAWINGS

The invention will now be explained with reference to FIG. 1 and FIG. 2 in which the device according to the invention is indicated in its entirety by 1, while a stencil 2 to be provided with end rings and with a design 13 is shown.

DESCRIPTION OF THE PREFERRED EMBODIMENT

An end ring 4 which has to be fitted has an adhesive receiving edge 3, while the clamping edge of the end ring which can mate with a stencil head of a machine is indicated by 5.

Figure 1:
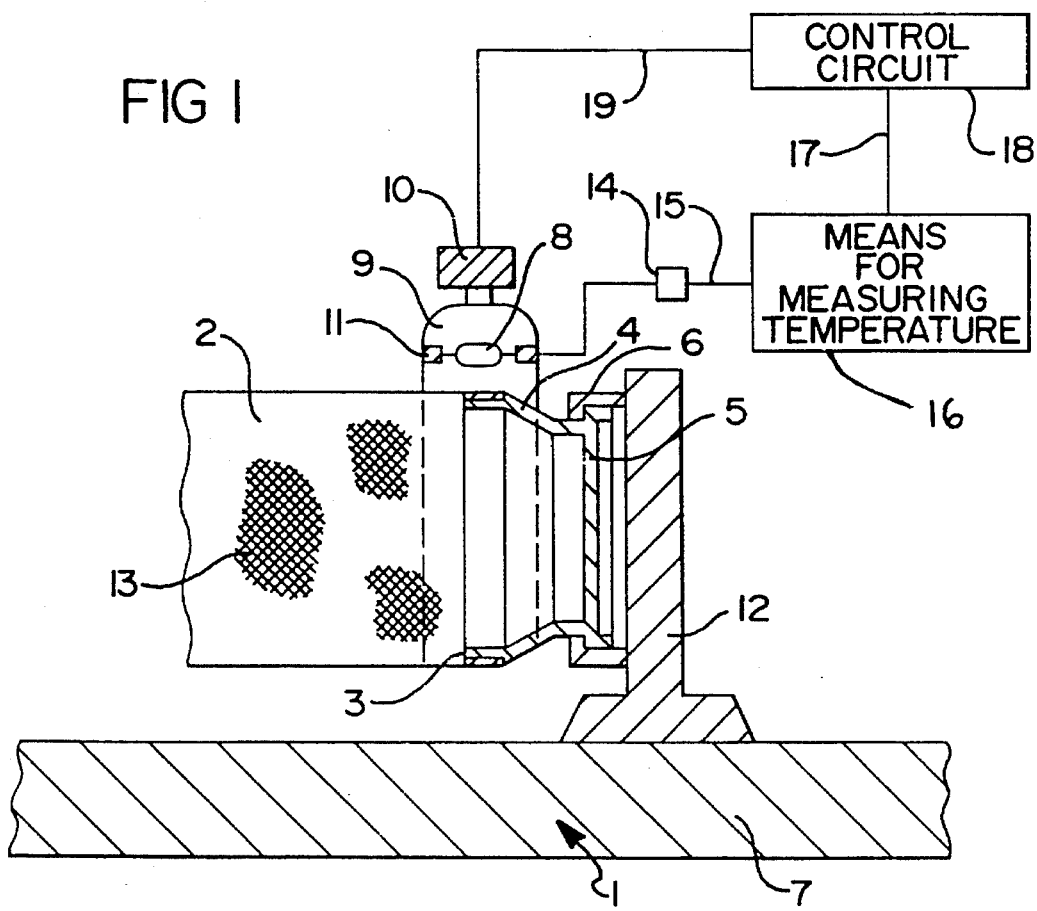
Figure 2:
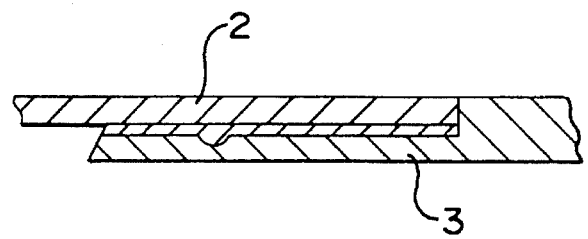

As can be seen in the enlarged detail a space in FIG. 2, the applied adhesive receiving lies between the adhesive edge 3 and the wall of the stencil 2. One or more grooves are expediently present in the adhesive edge to take a larger quantity of adhesive and promote adhesion of the adhesive to the adhesive edge and the stencil.

In this case, as shown schematically, the clamping edge is gripped by a nesting edge 6; at the other side of the stencil (not shown here) a similar nesting clamping edge 6 is present to take the clamping edge 5 of the end ring at the other side of the stencil. The nesting clamping edge 6 is connected to a bearing element 12 which is fixed on the bearing table 7 in such a way that it is mobile.

An infrared element 8 is set up a short distance away from the surface of the stencil at the adhesive receiving edge 3. The infrared radiator 8 is accommodated in terminals 11 which are connected in a manner not shown to an electrical power source. The infrared radiator 8 is surrounded at one side by a reflector 9, for example in the form of a parabolic or elliptical mirror. The reflector 9 on which the terminals 11 are fixed, or through which they project, is fixed to a retaining element 10 which is connected to firm ground in a manner not shown. The retaining element 10 permits adjustment of the infrared radiator 8 relative to the outside of the stencil. It is expedient for means to be present to rotate the stencil with the end rings 4 fixed in a clamping manner therein about an axis which coincides with the axis of the stencil For that purpose, in that case bearing means which permit rotation of the end ring nesting clamp 6 relative to the bearing element 12 are present. In a specific case, depending on the repeat size of the stencil in question 3 to 10 infrared radiators of e.g. 300 watts each are placed. With a standard 64 cm repeat (a periphery of 64 cm) stencil six 300-W radiators are, for example, used.

A suitable blocked curable epoxy resin/hardener system which in the present case sets at approx. 110° C. was set in 2 to 5 minutes using the radiators indicated. A post-curing operation which is commonly used in devices according to the state of the art was found not to be necessary. No difference was found between the use of metal end rings and the use of plastic end rings.

It is pointed out that the means indicated in the present description for supplying the infrared radiation generally produce radiation in the infrared region between 760 and 10,000 nanometers.

Means for measuring 16 the temperature of the stencil 2 in question at the adhesive edge 3 is provided. The means for measuring 16 utilizes a temperature sensor 14 that is connected with the means for measuring 16 the temperature. The means for measuring 16 the temperature also can employ various devices known to the skilled artisan. The means for measuring 16 the temperature is further connected to a control circuit 18. The control circuit 18 ensures regulation of the working of the infrared radiator 8 according to the difference between the measured value of the temperature as indicated by the means for measuring 16 the temperature and a set value which is set in the control circuit 18. The control circuit 18, through a connecting line 19, adjusts the infrared radiator 8 by the use of the retaining element 10. The control circuit 18 can employ any number of control means known to one skilled in the art.

With the use of the present invention it is sufficient to apply adhesive to the adhesive edge of the end ring. No difference in strength is found compared with the earlier situation in which adhesive was applied both to the end ring adhesive edge and to the inside of the stencil edge.

With the use of a blocked epoxy resin/hardener system setting at approx. 110° C., as indicated above, the device according to the invention can also be used for the removal of end rings. The stencil provided with rings is to this end accommodated in the device, following which the set adhesive coating is heated by infrared radiation to approx. 200° C. for 10–15 mins.

The adhesive then undergoes an embrittlement, following which a light hammering action causes the end ring to be released by the stencil.

I claim:

1. A device for fixing end rings (4) to a rotary screen printing stencil (2), having a periphery and ends, the ends each having an adhesive receiving edge, the end rings being fixed to the ends of the rotary screen printing stencil said device comprising: means for positioning a stencil (2) and end rings (4) relative to each other, to form an assembly thereof, and heating means for curing an adhesive, said adhesive is applied to an adhesive receiving edge of each of the end rings for the formation of a connection between said stencil (2) and said end rings (4), through adhesion, characterized in that the heating means is an infrared radiation-producing means set up at a distance outside of the rotary screen printing stencil (2) in the vicinity of the ends thereof and said means for positioning including means for rotating the assembly of said stencil and said end rings about a longitudinal axis of the stencil.

2. The device according to claim 1, wherein the infrared radiation-producing means comprises:

at least two infrared radiators (8) and each infrared radiator (8) is provided with a suitable reflector (9) which can beam the radiation to form a defined beam the beams partially overlapping, the number of infrared radiators (8) being selected in such a way that the partially overlapping beams can uniformly radiate the entire periphery of the stencil (2) in question.

3. The device according to claim 2, further comprising:

a heat-insulating material set up at the side of the reflector (9) facing away from the infrared radiator (8).

4. The device according to claim 1 comprising:

means for adjusting the infrared radiation-producing means.

5. The device according to claim 1 further comprising:

(a) means for measuring the temperature of the stencil at the adhesive edge, and (b) a control circuit connected to the means for measuring for regulation of the infrared radiation-producing means according to the difference between a measured value of the temperature and a set value.

6. The device according to claim 5 wherein: the heating means embrittles and disconnects the adhesive.

\* \* \* \* \*